(12) United States Patent
Snodgrass et al.

(10) Patent No.: US 8,826,036 B1
(45) Date of Patent: Sep. 2, 2014

(54) EBOOK ENCRYPTION USING VARIABLE KEYS

(75) Inventors: Ryan J. Snodgrass, Kirkland, WA (US); James C. Slezak, Seattle, WA (US); Matthew E. Goldberg, Seattle, WA (US); Jeremie Leproust, Paris (FR); Guillaume Jeulin, Bois-Colombes (FR); Felix F. Antony, Isaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 879 days.

(21) Appl. No.: 12/825,156

(22) Filed: Jun. 28, 2010

Related U.S. Application Data

(60) Provisional application No. 61/255,954, filed on Oct. 29, 2009.

(51) Int. Cl.
*G06F 11/30* (2006.01)

(52) U.S. Cl.
USPC ............ 713/189; 726/3; 726/11; 726/23; 370/235; 370/252; 709/223; 380/44; 380/30; 380/29; 713/171; 713/168; 713/321; 713/100

(58) Field of Classification Search
CPC ............ G03F 21/6209; G03F 21/10; G03F 2221/2153; G06Q 20/123; G06Q 20/1235; G06Q 20/28; G06Q 20/32; G06Q 20/367; G06Q 20/3821; G06Q 20/3829; G06Q 20/06; H04L 9/0861
USPC ............ 713/189, 171, 168, 321, 100, 160; 380/25, 9, 21, 23, 29, 30, 50, 44; 395/186, 187.01; 726/3, 11, 23; 370/235, 252; 709/223
See application file for complete search history.

(56) References Cited

U.S. PATENT DOCUMENTS

| | | | |
|---|---|---|---|
| 7,380,120 B1* | 5/2008 | Garcia ........................ | 713/160 |
| 2003/0076955 A1* | 4/2003 | Alve et al. .................. | 380/201 |
| 2006/0059179 A1* | 3/2006 | Asano ......................... | 707/100 |
| 2006/0200415 A1* | 9/2006 | Lu ................................ | 705/50 |
| 2006/0200865 A1* | 9/2006 | Leake et al. ................ | 726/27 |
| 2008/0232598 A1* | 9/2008 | Vennelakanti et al. ..... | 380/279 |
| 2013/0177153 A1* | 7/2013 | Gerraty ........................ | 380/44 |

* cited by examiner

*Primary Examiner* — Brian Shaw
(74) *Attorney, Agent, or Firm* — Lee & Hayes, PLLC

(57) ABSTRACT

An electronic book distribution system encrypts distributed electronic books ("eBooks") with a content key. The content key is in turn encrypted with a voucher key. The voucher key for a particular eBook is generated based on a combination of (a) an ID or serial number of an eBook reader device to which the eBook is being distributed, (b) a user account secret associated with a user of the eBook reader device, and (c) metadata associated with the eBook itself.

34 Claims, 10 Drawing Sheets

EBOOK ENCRYPTION USING VARIABLE KEYS

BACKGROUND

This application claims the benefit of U.S. Provisional Application No. 61/255,954 filed on Oct. 29, 2009, which is incorporated by reference herein in its entirety.

BACKGROUND

Books and other similar media items are increasingly being delivered and consumed in electronic format, rather than on traditional paper or other physical media, for display on electronic viewing devices such as computers and mobile telephones. These viewing devices enable fast and low cost delivery of the electronic content via a network such as the Internet, mobile telephone networks, and so forth.

Digital rights management (DRM) is a critical component in the distribution of electronic books. Without effective DRM, authors and publishers would likely resist electronic distribution of their works. Indeed, electronic book distribution relies on an economic model that assumes effective DRM.

Existing DRM technologies applied to book distribution include encrypting the books using conventional symmetrical encryption techniques. Prior to distribution, a book is encrypted with a key that is either known to the consumer's reader device or can be somehow calculated or obtained by the reader device as needed. In order to prevent books from being freely shared between different reader devices, the encryption key is different for each reader device.

In one popular scheme, the encryption key is calculated as a function of the serial number of the device on which the book will be rendered. Before distributing a book for consumption on a particular reader device, a content server must know the serial number of the device. Assuming such knowledge, the server calculates the encryption key using a pre-defined algorithm that is a function of the device serial number, and encrypts the book using that encryption key.

After receiving the encrypted book, the reader device uses its serial number and the pre-defined algorithm to recalculate the encryption key, and uses that key as a decryption key to decrypt the book so that it can be rendered in an intelligible format to a user.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
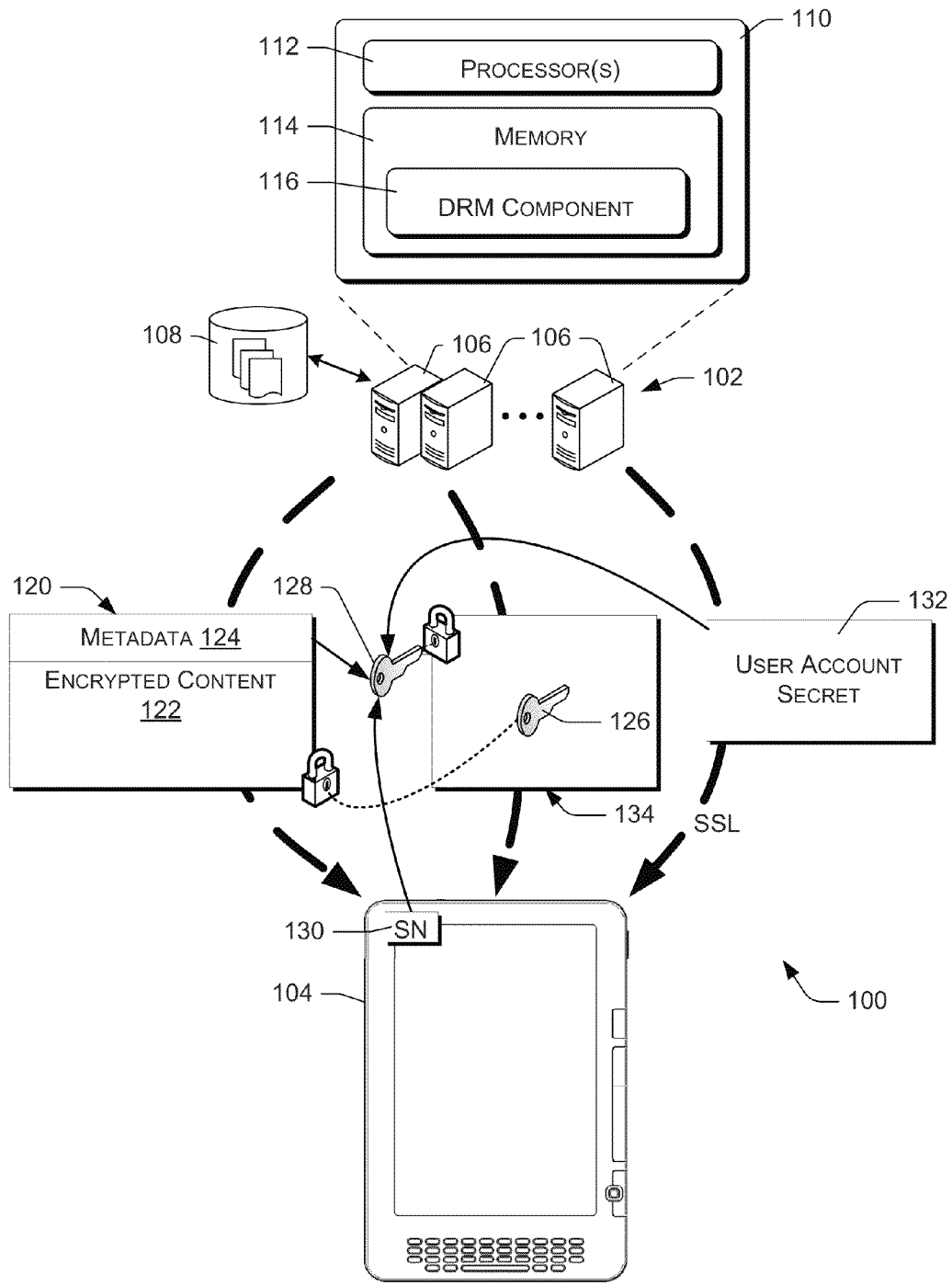
FIG. 1 is a schematic diagram of an illustrative environment that includes various computing devices that distribute, supervise, and consume electronic content.

This disclosure describes an architecture and techniques in which electronic content or media items are distributed to rendering devices for consumption by human users of the rendering devices. The media items may be any type or format of digital content, including, for example, electronic texts (e.g., eBooks, electronic magazines, digital newspapers, etc.); digital audio (e.g., music, audible books, etc.); digital video (e.g., movies, television, short clips, etc.); images (e.g., art, photographs, etc.); applications or programs; interactive or "rich" book content containing graphics, animations, video, and/or audio; and multimedia content. In the illustrated environment, an electronic book reader device is provided to consume digital media items, such as electronic books, magazines, audio books, and so forth.

The content rendering devices may be embodied in many ways, such as electronic book readers, cellular telephones, personal digital assistants (PDAs), portable media players, tablet computers, netbooks, and the like. However, in specific implementations described below, the rendering device is a dedicated handheld electronic book (eBook) reader device ("eBook reader device" or simply "eBook reader"). A device such as this is typically configured for the specific task of rendering electronic books, and is not generally alterable by the user to perform tasks not anticipated by the manufacturer of the device.

As discussed above, identifying and preventing unauthorized uses of electronically distributed media items is important to authors and electronic publishers. In the examples below, this is accomplished by protecting digital works with a key that is a function of information that is variable on information that is not necessarily directly associated with the consuming reader device. In particular, the key varies depending on the identity of the authorized user of the eBook or of the eBook itself.

For example, the key might be calculated based on a user account secret—some piece of information corresponding to a particular user or user account. In this scenario, the reader device might employ both its serial number and the user account secret in order to unlock a particular media item.

As another example, the key might be calculated based on unencrypted metadata associated with a distributed electronic book. Such metadata might include, for example, information about the book, such as author and publishing date, as well as usage rights information. The usage rights information indicates allowable uses of the electronic book copy, such as whether text-to-speech functionality is allowed. By calculating the key based on this information, any changes to the information results in an invalid key, preventing the reader device from opening the book. In this scenario, the reader device employs its serial number and the correct metadata in order to unlock a digital work.

As yet another example, the digital work might be protected with a key that is calculated as a function of (a) the device serial number, (b) a user account secret, and (c) unencrypted metadata associated with the digital work.

The techniques and systems described herein may be implemented in a number of ways. Example implementations are provided below with reference to the figures.

Illustrative Architectural Environment

FIG. 1 is a schematic diagram of an illustrative architectural environment 100 that includes various computing devices for distributing and consuming electronic works such as digital or electronic books. In particular, FIG. 1 illustrates an electronic book distribution environment including a supervisory service 102 and a dedicated electronic book reader device 104.

Supervisory service 102 comprises one or more servers 106 and associated data storage 108 that serve or provide electronic content to consuming devices such as the eBook reader device 104. In the example described herein, the electronic content includes electronic books and other textual publications that are distributed in digital form rather than on physical media. Electronic content might also comprise audio or graphical elements, either alternatively or in addition to textual content. Moreover, the term "eBook", as used herein, includes electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the term "eBook" may include any readable or viewable content that is in electronic or digital form.

The servers 106 collectively have processing and storage capabilities to receive requests from the reader device 104 and respond to such requests by delivering media items from storage 108. Alternatively, supervisory server 102 and its individual servers 106 might push media items and other data to device 104 without receiving requests—communications might be essentially one way, from server 102 to reader device 104. The media content is typically stored in data storage 108, from where it is retrieved, encrypted, and transmitted to individual reader devices.

In the described implementation, servers 106 also supervise subscribing eBook reader devices, such as device 104, facilitating book selection, ordering, delivery, payment, and so forth. Furthermore, servers 106 participate in digital rights management (DRM) procedures, ensuring that authorized users and devices have access to purchased media items while also denying such access to unauthorized users or devices.

The servers 106 may be embodied in any number of ways, including as a single server, a cluster of servers, a server farm or data center, and so forth, although other server architectures (e.g., mainframe) may also be used. FIG. 1 illustrates simplified components 110 of the collective servers, including one or more processors 112 and computer-readable memory 114. Memory 114 includes both volatile and nonvolatile memory such as used for storing applications, modules, and/or data. This memory stores computer-readable instructions that are executable by processor 112 to perform the actions and techniques described below as being performed by supervisory server 102 or its component servers 106.

Most relevant to the following discussion is a DRM component or program 116 that performs various licensing and encryption functions as will be more fully described below.

In some embodiments, servers 106 and the viewing device 104 may communicate via one or more network(s) to facilitate transfer of electronic content. Examples of such networks include both wired based networks (e.g., cable), as well as wireless networks (e.g., cellular, WiFi, satellite, etc.). In addition or as an alternative, the content may be transferred between the servers 106 and the viewing device 104 via removable storage media such as secure digital (SD) memory cards, portable hard disks, and other portable storage media and/or devices. As yet another alternative, viewing device 104 may be connected to another device that facilitates communication with servers 106. For example, a personal computer (not shown) might communicate over a network with servers 106, and relay desired information to and from viewing device 104 via a communication medium such as USB or Bluetooth.

FIG. 1 shows an example of a single eBook 120 being delivered to reader device 104. The eBook 120 includes an encrypted content portion 122 and an unencrypted metadata portion 124. The encrypted content portion 122 includes the body or content of the eBook, encrypted by the DRM component 116 prior to delivery. The metadata 124 is delivered in an unencrypted state and includes data relating to the eBook and its distribution, such as descriptive data and user rights information. Descriptive data may include author name, title, publication date, publisher name, size, number of chapters, and so forth. User rights information includes parameters describing what things a user is authorized to do with the book.

As mentioned, the content portion 122 of eBook 120 is encrypted before delivery. In this example, the eBook 120 is encrypted with a content key 126 that is randomly generated at the supervisory server 102. The randomly generated content key 126 is itself encrypted with another key 128, referred to as a voucher key. Voucher key 128 is not generated randomly, but rather is generated from several codes or parameters that are known or obtainable by both the server 102 and the eBook reader device 104.

Specifically, in this example, voucher key 128 is generated based on (a) a serial number 130 or other device ID of the reader device 104, (b) a user account secret 132 associated with a user of the reader device or a user account that is associated with reader device 104, and (c) pre-defined portions of the metadata 124.

The content key 126 is optionally included, prior to encrypting, within a data object referred to as a voucher 134. The voucher 134—containing content key 126 and optional other data—is encrypted with the voucher key 128.

In one implementation, the user account secret 132 is a randomly generated text sequence or code that is associated with an account maintained for a user by supervisory server 102. A user account can correspond to a single user or to a group of users such as a family. In many environments, an eBook is purchased by a user with a user account. Once purchased, the eBook can be loaded onto several reader devices and potentially viewed by several users. There is typically a limit on the number of devices upon which the eBook can be simultaneously loaded, or the number of devices that can be simultaneously associated with a single user account.

When a reader device, such as device 104, is associated with a user account, an encrypted SSL communication session is established between reader device 104 and server 102. Various parameters are exchanged to enable the association between reader device 104 and server 102. One such parameter is the user account secret 132. Each user account has one user account secret 132, and this user account secret is loaded onto each reader device which is to be associated with the user account.

In order to decrypt the content 122 and thereby open eBook 120, the reader device 104 uses its serial number 130, the pre-selected metadata 124, and the user account secret 132 to recreate voucher key 128. Reader device 104 then users the voucher key to reconstruct or otherwise obtain access to the content key 126. The content key 126 may then be used as the key to decrypt the content 122, thereby allowing the eBook reader device 104 to render the book for consumption by the user.

Server Operation

Figure 2:
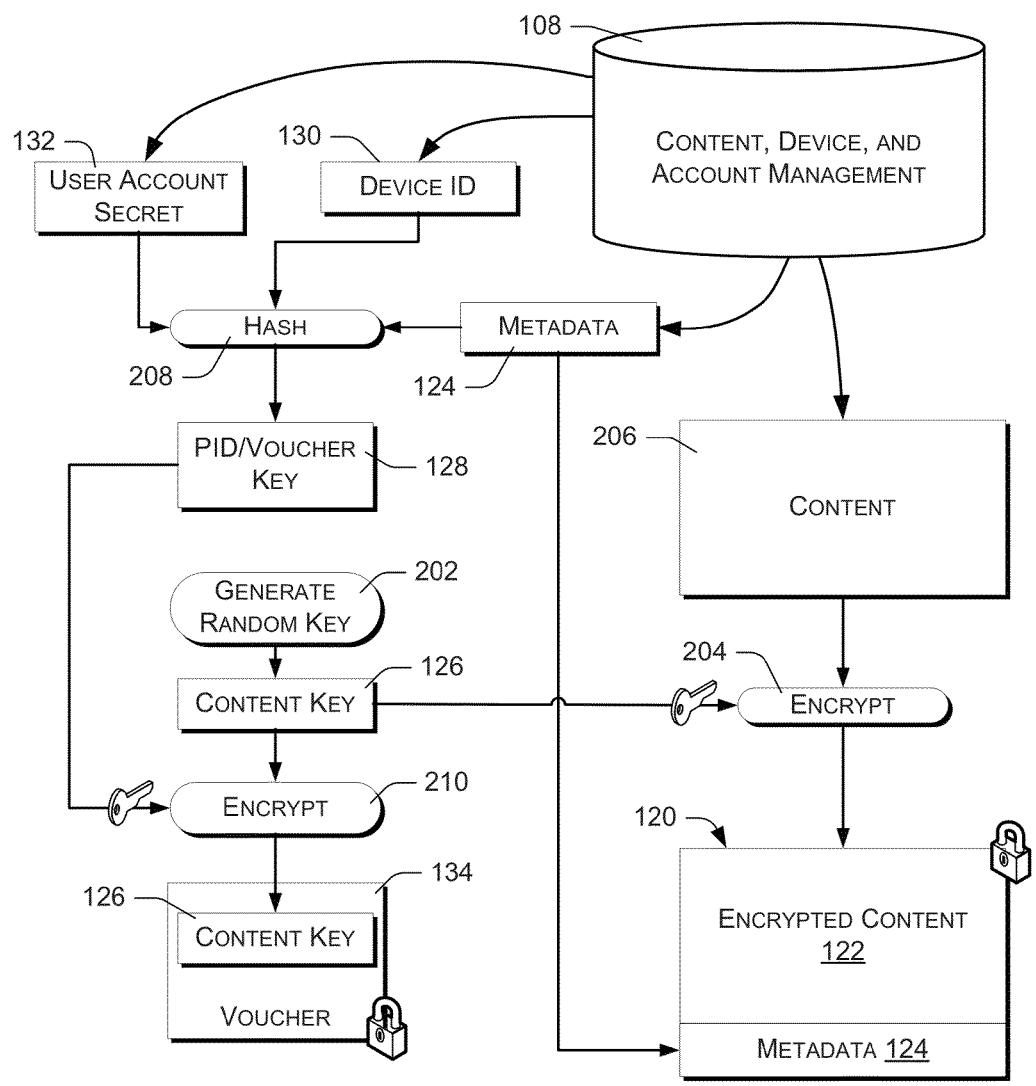
FIG. 2 is a schematic diagram illustrating encryption of an electronic book (eBook).

FIG. 2 illustrates operations performed by the server 102 to generate the various keys and encrypt the content as described above. For discussion purposes in this illustration of FIG. 2, data is represented as rectangular blocks, whereas operations or actions are represented as rounded blocks.

As described above, the server 102 maintains data storage 108 that contains information relating to users, user accounts, eBooks and other media items or content, registered devices, and content licenses purchased by system users. Most relevantly, data storage 108 keeps track of device IDs or serial numbers, account secrets, and the randomly generated content keys that are used to encrypt eBook content.

When a book is to be provided to a reader device, the server 102 performs an action 202 of randomly generating the content key 126. The randomly generated content key 126 is used as an encryption key in an action 204 of encrypting eBook content 206, resulting in encrypted content 122. The encrypted content 122 is combined with unencrypted eBook metadata 124 to form a locked or encrypted eBook 120, also referred to herein as a media item package.

The server 102 also performs a hash function 208 on one or more input parameters to form a personal identifier (PID), which is used as the voucher key 128. The hash function 208 is based on (a) a reader device ID or serial number 130 of the device to which the eBook will be delivered and loaded, (b) the user account secret 132 of the user account used to purchase or obtain rights to view the eBook, and (c) portions of the metadata 124. In particular, the hash function 208 is a one way hash function such as a Message Digest 5 (MD5) one-way hash function, a Secure Hash Algorithm (SHA), or Advanced Encryption Standard (AES) hash function, using these three parameters or strings as input parameters.

As mentioned above, eBook metadata might include descriptive information about the eBook content itself. In addition, the metadata might contain usage rights information. In certain implementations, the metadata is provided in key-value pairs. The key is an identifier indicating or describing a particular value. For example, "TTS" might be a key having a value of "enabled" or "disabled". This indicates whether "text-to-speech" functionality is enabled or disabled for this particular eBook.

Other key-value pairs might include:
  printing limits, specifying portions or percentages of the eBook that are allowed to be printed;
  sharing limits, specifying portions or percentages of the eBook that are allowed to be emailed or otherwise shared with other people;
  device ID or serial number of the reader device for which the content has been licensed;
  content expiration, specifying a date upon which content expires and can no longer be accessed, for rentals or temporary purchases;
  social watermark, indicating whether the eBook has been loaned, including who it was loaned from and who it is loaned to;
  purchase date of the eBook;
  geographic restrictions, specifying geographic regions where consumption of the eBook is allowed or disallowed;
  URLs to supervisory servers or other servers, such as links to additional eBook information, annotation backup servers, search index servers for the particular eBook, publisher link for submitting errata, etc.;
  encrypted password to be obtained from a user before unlocking the eBook;
  release date, specifying a time before which the eBook is not allowed to be opened or unlocked;
  publisher info such as the name and website URL of the publisher;
  device type restrictions, indicating which types of reader devices are or are not allowed to unlock and open the eBook;
  URL from which to obtain updates or other dynamic features for the eBook, such as where an instructor is posting assignments associated with the eBook, for example;
  URL for publishing of data from customer usage, such as the URL of a server that stores the last page read, the number of times the eBook was opened, the number of dictionary lookups, and other metrics;
  social website URL, specifying where a user might report reading the eBook, reading progress, reviews, or comments;
  customer ID or device account ID, specifying who should be attributed for post-publication modifications or contributions to the eBook;
  limits on the number of times the eBook can be opened;
  unique identifier or serial number of the eBook, such as its ISBN;
  customer identification, specifying information about the customer to which the eBook as been licensed or sold.

The metadata used to calculate the voucher key 128 may or may not include all of the available metadata. In some cases, a subset of the metadata will be selected and agreed upon beforehand to be used in calculating the voucher key 128. In other cases, the metadata itself will contain a special key-value pair that specifies a tamper-proof key list: a list of those metadata items that have been or should be included in the subset of metadata used to calculate voucher key 128.

In the case where the metadata comprises key-value pairs, both the keys and the values of each designated pair are included in the hash function that generates the voucher key 128.

The voucher key 128 is used as a key in an encryption action 210 of encrypting the randomly generated content key 126. Optionally, the content key 126 is packaged in a data object with other types of data that may be used for other purposes. The package, referred to as an item voucher or book voucher, is then encrypted using PID 128 as a key, to produce encrypted book voucher 134 that securely contains content key 126.

Both the voucher 134 and the eBook 120 are provided to the authorized eBook reader device. The voucher and eBook may be bundled together and delivered as an integral package, or delivered separately to the device and subsequently associated with one another. Furthermore, while the voucher creation and book encryption are described above as being performed by the server 102, these operations may be performed by independent parties (e.g., content creator/publisher and content distributor), and hence delivered by separate sources. Furthermore, a single reader device can store more multiple vouchers corresponding to a single eBook, thereby allowing different users to unlock the same eBook on the single reader device. Similarly, some embodiments might allow user secrets to be shared between users, providing a way for multiple users to share an eBook on different reader devices.

Reader Operation

Figure 3:
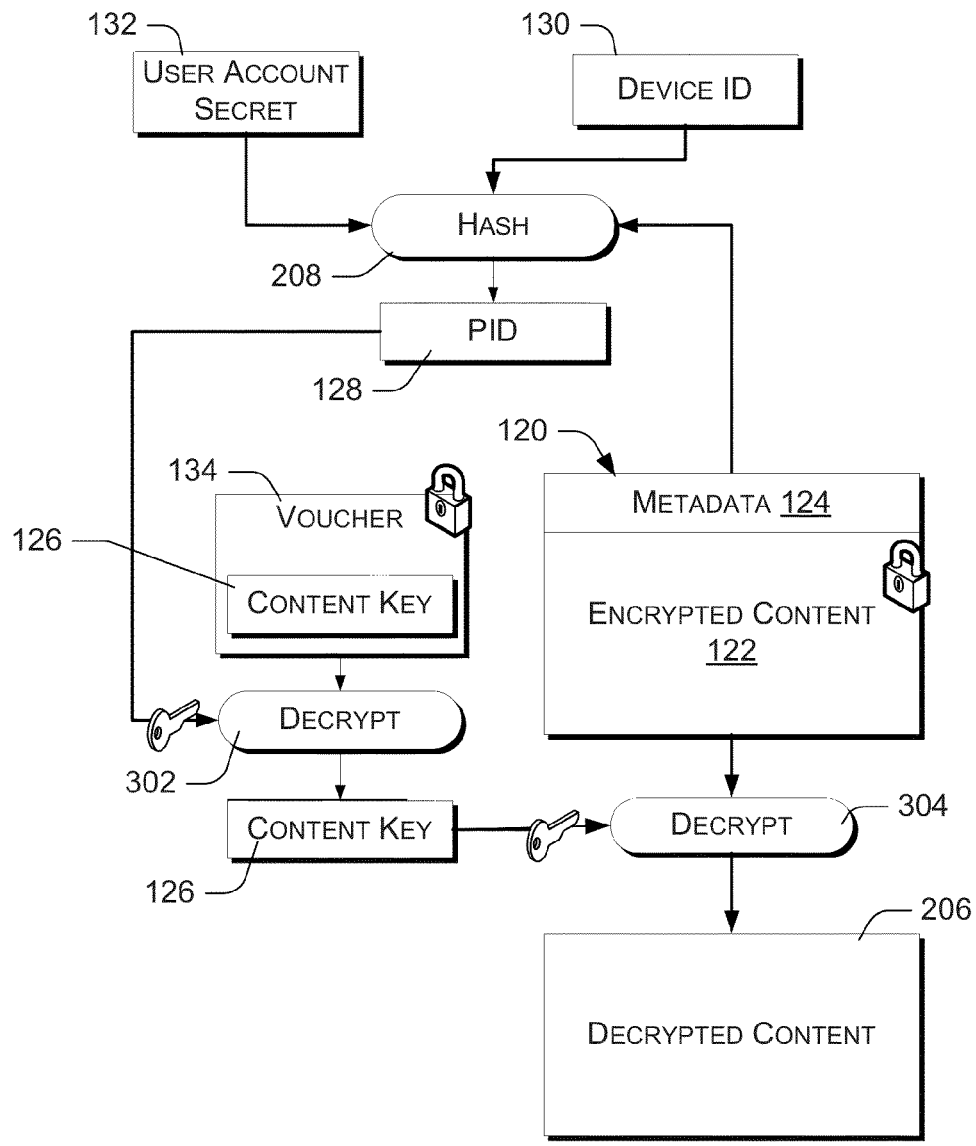
FIG. 3 is a schematic diagram illustrating eBook decryption.

FIG. 3 illustrates operations performed by the eBook reader device 104 to unlock the content key and decrypt a received eBook. As above, data is represented as rectangular blocks, whereas operations or actions are represented as rounded blocks.

The eBook 120 and the book voucher 134 are received at the eBook reader device 104 from the server 102. Once received, the reader device 102 performs the hash function 208 on user the user account secret 132, device ID 130, and the applicable subsection of metadata 124. This is the same hash function previously performed by the server 102, as described above with respect to FIG. 2. The hash function yields the voucher key 128, which is identical to the voucher key generated in the process of FIG. 2 and used to encrypt the voucher 134.

As mentioned above, the appropriate key-value pairs used as input to the hash function can be agreed upon beforehand. Alternatively, the metadata can include a special key whose value specifies those of the remaining key value pairs that are to be used as input to the hash function.

Using the metadata in this way, as input to derive the voucher key, allows the specified metadata to be protected from tampering. Because both the key and the value of any specified pair is included in the hash calculation, alteration of either will cause the calculated voucher key to be invalid. Thus, the eBook cannot be unlocked with any key value pairs other than those that were originally specified with the eBook.

The voucher key 128 is used as a decryption key in an action 302 of decrypting the book voucher 134. The content key 126 is extracted from the decrypted voucher and used as a decryption key in an action 304 of decrypting the content 122. This yields the original plain-text content 206. The eBook reader device may then render the content 206 on a display for viewing by the user. The content is maintained on the eBook reader device in its encrypted form, and hence the operation shown in FIG. 3 is repeated each time the user chooses to open and consume the content. In other usage scenarios, the content may be maintained on the eBook reader device in plain-text form following this operation of FIG. 3.

Exemplary Reader Device

Figure 4:
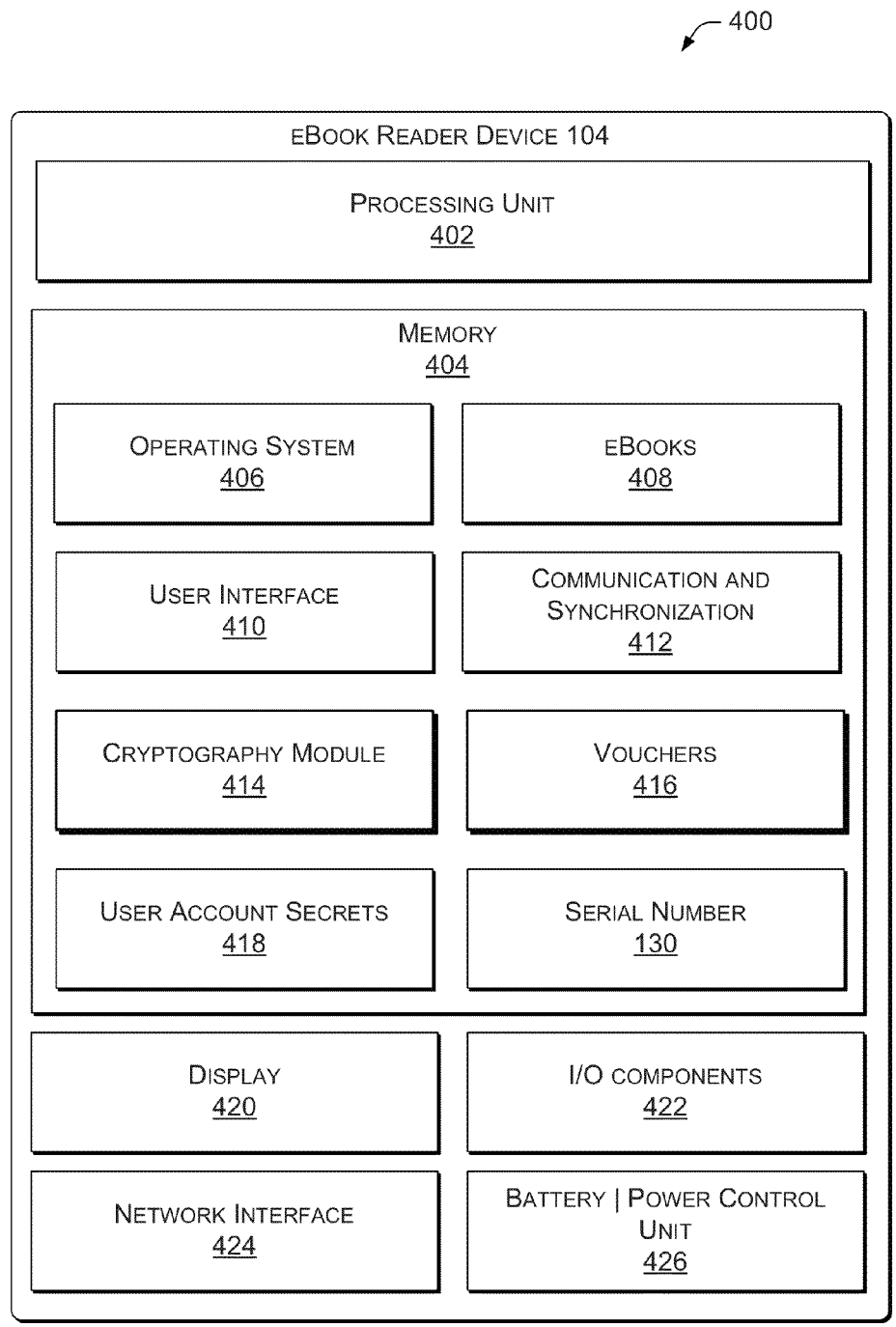
FIG. 4 is a block diagram illustrating relevant components of an exemplary eBook reader device.

FIG. 4 illustrates exemplary components 400 that might be implemented in the eBook reader device 104. In this embodiment, the eBook reader device 104 is a dedicated, handheld eBook reader device equipped with a passive display to display eBooks.

In a very basic configuration, the eBook reader device 104 includes a processing unit 402 composed one of one or more processors, and memory 404. Depending on the configuration of a dedicated eBook reader device 104, the memory 404 is an example of computer storage media and may include volatile and nonvolatile memory. Thus, the memory 404 may include, but is not limited to, RAM, ROM, EEPROM, flash memory, or other memory technology, or any other medium which can be used to store media items or applications and data which can be accessed by the eBook reader device 104.

The memory 404 may be used to store any number of functional components that are executable on the processing unit 402, as well as data and media items that are rendered by the eBook reader device 104. Thus, the memory 404 may store an operating system 406 and an eBook storage database to store one or more media items 408, such as eBooks and audio books.

A user interface module 410 may also be provided in memory 404 and executed on the processing unit 402 to provide for user operation of the device 104. The UI module 410 may provide menus and other navigational tools to facilitate selection and rendering of the media items 408. The UI module 410 may further include a browser or other application that facilitates access to sites over a network, such as websites or online merchants.

UI Module 410 may include a content presentation application that renders the media items 408. The content presentation application may be implemented as various applications depending upon the media items. For instance, the application may be an electronic book reader application for rending electronic books, or an audio player for playing audio books, or a video player for playing video, and so forth.

A communication and synchronization module 412 is stored in memory 404 and executed on the processing unit 402 perform management functions in conjunction with server 102. Communication and synchronization module 412 communicates with supervisory server 102 to receive eBooks 408 and to receive the various data objects discussed above, such as the user account secret and vouchers associated with eBooks.

Memory 404 also stores a cryptography module 414 that performs the various hashing, key generation, and decryption functions performed on the eBook reader device 104, as described above with reference to FIGS. 1-3.

Vouchers 416, user account secrets 418, and the serial number 130 of the reader device may also be stored in memory 404. The vouchers 416 are associated with corresponding eBooks 408. As above, the vouchers 416 may be provided together with the eBooks 408, or apart from their associated eBooks, at different times. One or more user account secrets 418 are stored on reader device 104 during a registration process. The serial number 130 is device specific.

The eBook reader device 102 may further include a display 420 upon which electronic books are rendered. In one implementation, the display uses ePaper display technology, which is bi-stable, meaning that it is capable of holding text or other rendered images even when very little or no power is supplied to the display. Some exemplary ePaper-like displays that may be used with the implementations described herein include bi-stable LCDs, MEMS, cholesteric, pigmented electrophoretic, and others. In other implementations, or for other types of devices, the display may be embodied using other technologies, such as LCDs and OLEDs, and may further include a touch screen interface. In some implementations, a touch sensitive mechanism may be included with the display to form a touch-screen display.

The eBook reader device 104 may further be equipped with various input/output (I/O) components 422. Such components may include various user interface controls (e.g., buttons, joystick, keyboard, etc.), audio speaker, connection ports, and so forth.

A network interface 424 supports both wired and wireless connection to various networks, such as cellular networks, radio, WiFi networks, short range networks (e.g., Bluetooth), IR, and so forth. Network interface 424 facilitates receiving electronic books and other content as discussed herein. Of particular note, the network interface 424 enables wireless delivery of the eBooks 408 and vouchers 416 over a wireless network.

The eBook reader device 104 also includes a battery and power control unit 426. The power control unit operatively controls an amount of power, or electrical energy, consumed by the eBook reader device. Actively controlling the amount of power consumed by the reader device may achieve more efficient use of electrical energy stored by the battery.

The eBook reader device 104 may have additional features or functionality. For example, the eBook reader device 104 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

General Operation

Figure 5:
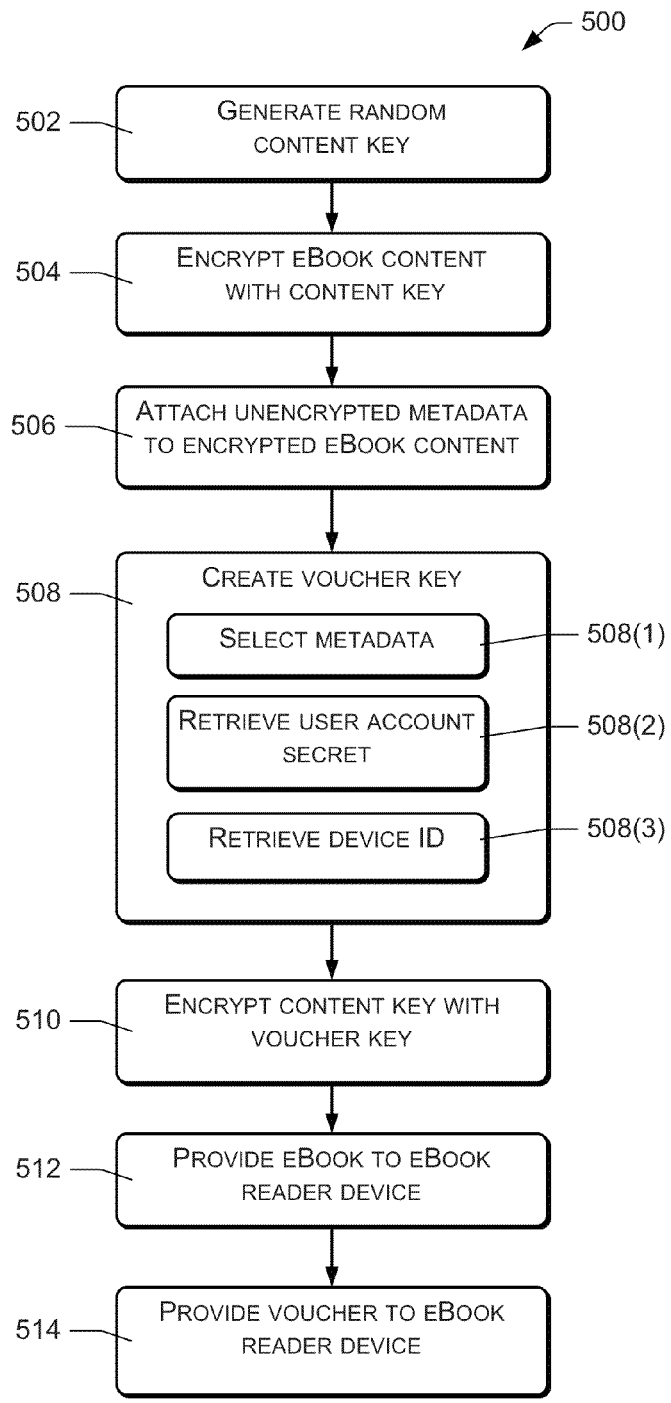
FIGS. 5-8 are flow diagrams illustrating exemplary processes performed in distributing, supervising, and consuming eBooks.

FIG. 5 illustrates a general process 500 performed by server 102 in encrypting and providing an eBook to a reader device. The process 500 (as well as the processes described below with respect to FIGS. 6-9) is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

At 502, in preparation for providing an eBook to a particular eBook reader, the server 102 randomly generates a first cryptographic key, also referred to herein as a random content key. At 504, the server 102 encrypts content of the eBook with the random content key. In addition, at 506, the server 102 attached metadata to the encrypted content. The metadata associated with the eBook is not encrypted with the random content key.

At 508, the server 102 creates a second cryptographic key, also referred to herein as a PID or voucher key. This act may be realized in three sub-actions 508(1)-(3). At 508(1), certain key value pairs are selected from the metadata of the eBook. Also, at 508(2), a user account secret that is or will be associated with the account of the user to whom the eBook is being provided is retrieved or created. At 508(3), the device ID or serial number of the eBook reader device to which the eBook is being delivered is identified or otherwise retrieved. These variables are typically known from data accessible to server 102.

The variables enumerated above are concatenated or otherwise combined and hashed to create a PID or voucher key. Thus, the voucher key is based on at least one of the following data objects: (a) a user account secret, (b) at least portions of the metadata, and (c) a device ID or serial number of a particular eBook reader.

Note that different combinations of these three data objects might be used in different situations. Specifically, some implementations might use all three data objects, while other implementations might use two of the data objects. For example, the device ID and the portions of the metadata might be used, without the user account secret, in some situations. In other situations the user account secret and portions of metadata might be used without the device ID. For purposes of explanation, the discussion of FIGS. 5-7 will assume that all three data objects are used in calculating the voucher key.

In one embodiment, those portions of the metadata used in the voucher key calculation are specified in a tamper-proof parameter or key list that is included in the eBook metadata. The tamper-proof parameter or key list specifies the keys of the key value pairs that are included in the voucher key calculation.

At 510, the server 102 encrypts the content key with the voucher key. In particular, the content key is optionally packaged with other data in a data object referred to as a voucher, media voucher, or book voucher. This voucher is encrypted using the PID or voucher key as a cryptographic key.

At 512, the server 102 provides the encrypted or locked eBook to an eBook reader device using any of the delivery techniques described above with reference to FIG. 1.

At 514, the server 102 provides the voucher to the eBook reader device, again using any of the data transfer methods described above with reference to FIG. 1. Note that the voucher need not be provided to the eBook reader device at the same time as the eBook is provided. It can be provided apart from the eBook itself, in a different communication session, either before or after the eBook is transferred to the eBook reader device. If provided sometime later, it will not be possible for the eBook reader device to unlock or open the eBook until receiving the voucher. This may be useful in some situations where it is desired to make an eBook delivery ahead of time, but not "activate" the delivery until a predetermined time—such as the release time for a new book. In this situation, the metadata associated with the activated eBook may also be updated along with providing the voucher.

Figure 6:
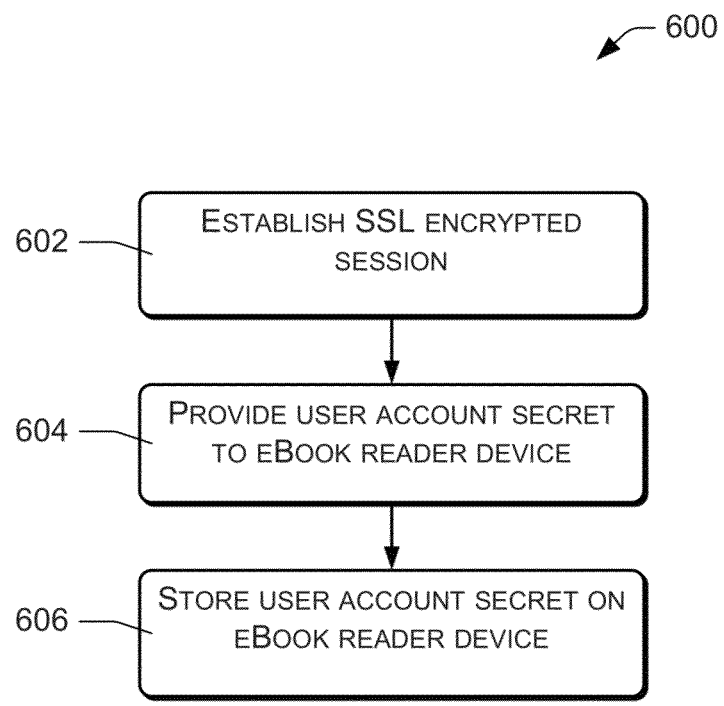

FIG. 6 illustrates a process 600 of providing or supplying the user account secret to the eBook reader device. At 602, the server and eBook reader device establish an SSL encrypted data communications session. At 604, the server transmits the user account secret to the reader device, and the reader device receives the user account secret during the encrypted communication session. At 606, the user account secret is stored on the reader device. In one implementation, the process 600 is performed during some type of registration session, before delivery of an eBook. Thus, the process 600 may not coincide with delivery of an eBook.

Figure 7:
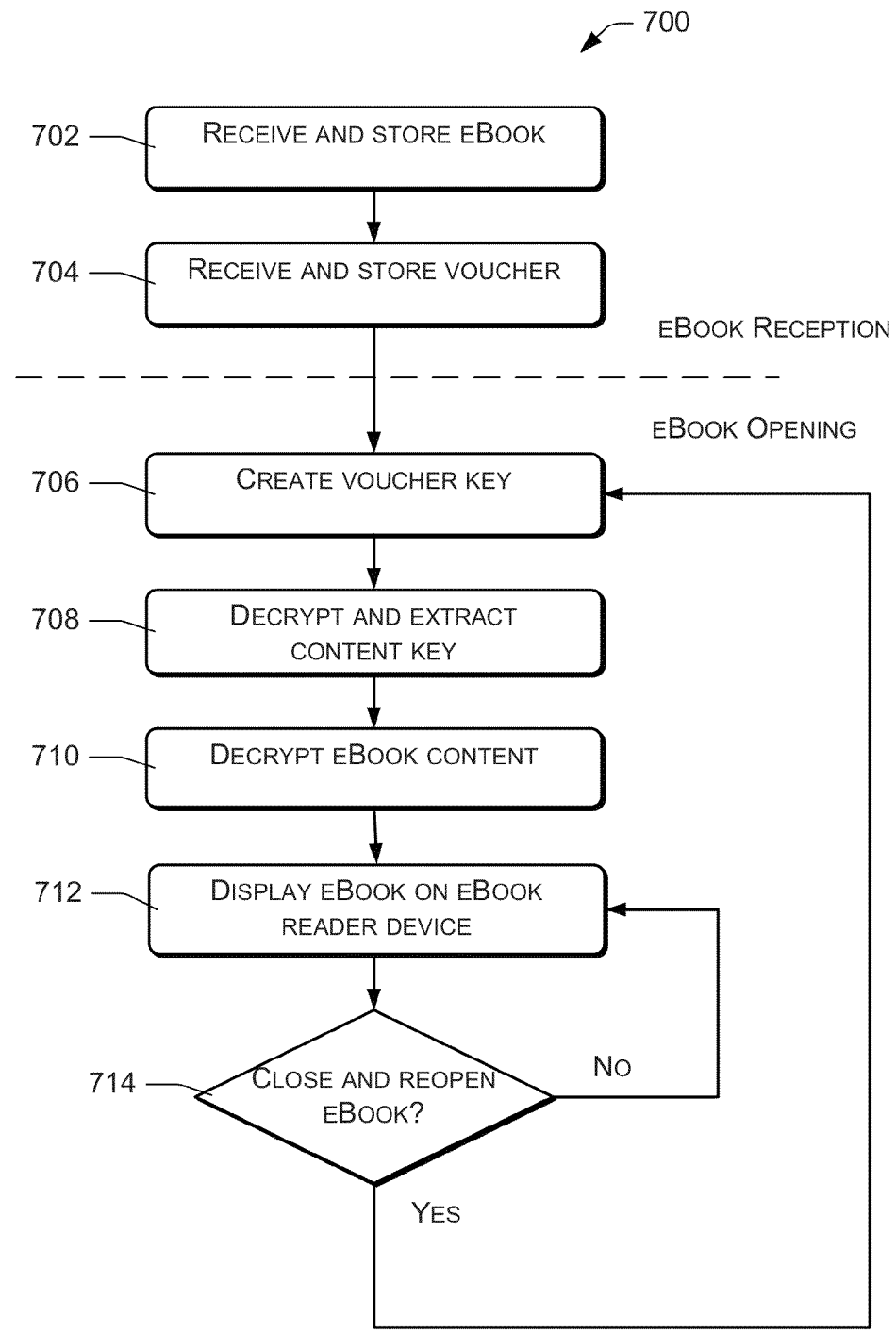

FIG. 7 illustrates a process 700 performed by eBook reader device 104 when the server 102 provides an eBook. The process 700 is illustrated as segmented into two sub-processes: (1) receiving the eBook at the eBook reader device 104 and (2) opening and displaying the eBook for consumption on the eBook reader device 104.

At 702, the eBook reader device receives the eBook, including its encrypted content and associated unencrypted metadata, and stores it in non-volatile memory. At 704, the eBook reader device receives the associated voucher and stores it in non-volatile memory. Again, note that the voucher is not necessarily received at the same time or in the same communications session as receiving the eBook itself. It may be received apart from receiving the eBook itself. Further, the eBook and voucher may be delivered by independent entities.

At 706, the eBook reader device 104 forms or recreates the voucher key associated with the eBook. This involves identifying the device ID or serial number of the eBook reader, retrieving the user account secret that was received and stored as described with reference to FIG. 6, and extracting the selected portions of the eBook's metadata. In one embodiment, these portions of the metadata are identified by obtaining and referring to a tamper-proof key list or parameter list. The tamper-proof parameter list is included as the value of a key specified in the eBook's metadata.

These values are concatenated or otherwise combined and hashed using as predefined hash function as already described to produce or form a PID or voucher key.

At 708, this PID or voucher key is used as a cryptographic key to help unlock the eBook. In particular, the voucher key is used to decrypt the item voucher that is associated with the eBook, and to recover the content key by extracting it from the voucher. At 710, the content key decrypts the content of the eBook using the extracted content key. At 712, the decrypted eBook is rendered on the display of the eBook reader device.

In many embodiments, the actions 706-712 are repeated each time a user requests the reader device to open the eBook. Neither the decrypted voucher nor the decrypted random content key is stored persistently on the reader device in these embodiments. Further, the plain-text version of the eBook is not stored persistently in these embodiments. Thus, at 714, the process 700 determines whether the user has closed and reopened the eBook. If no (i.e., the "No" branch from 714), the eBook continues to be rendered for viewing by the user. On the other hand, once the user has closed the eBook and then requests to reopen the eBook (i.e., the "Yes" branch from 714), the process 700 returns to creating the voucher key at 706 to begin the acts of decrypting the eBook.

As already mentioned, the voucher key received by a reader device might have been formed as a combination of at least three data objects: (a) a user account secret, (b) at least portions of the metadata, and (c) a device ID or serial number of a particular eBook reader. As also mentioned, however, the voucher key might have been formed or created based on less than all of the three data objects. Specifically, the voucher key might have been formed based on a subset of a parameter set, where the parameter set comprises one or more of the following data objects: the user account secret, selected portions of the metadata, and the device ID.

Figure 8:
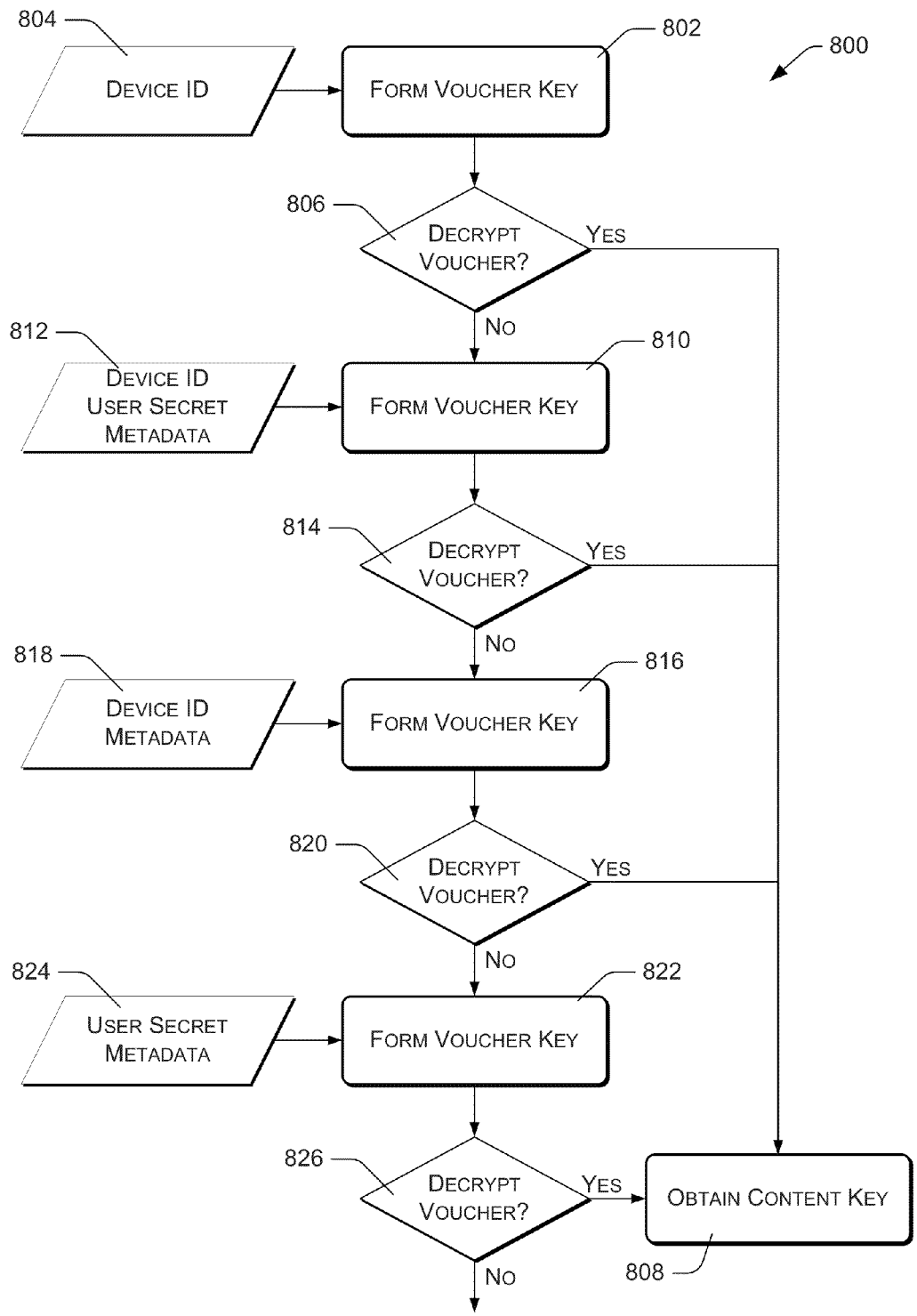

FIG. 8 illustrates a process 800 of creating a voucher key on a reader device such as the eBook reader device 104 of FIG. 1 when different combinations of data objects might have been used in creating the received voucher key. Specifically, FIG. 8 shows how a reader device might try several different combinations of the three described data objects in order to adapt to these situations.

At 802, the reader device forms a voucher key based on a subset 804 of available data objects. In this case, the subset 804 comprises simply the device ID or serial number. At 806, the voucher key is used in an attempt to decrypt the voucher. If the decryption is successful, the content key is obtained from the decrypted voucher at 808.

If the attempted decryption at 806 is not successful, the reader device forms the voucher key at 810 based on a subset 812 of available data objects. The subset 812 comprises the entire parameter set: the user account secret, the selected portions of the metadata, and the device ID. In cases where the reader device is associated with multiple user account secrets, act 810 will comprise forming a voucher key corresponding to each of these user account secrets. At 814, the voucher key or keys are used in an attempt to decrypt the voucher. If the decryption is successful with any one of the voucher keys, the content key is obtained from the decrypted voucher at 808.

If the attempted decryption at 814 is not successful, the reader device forms the voucher key at 816 based on a subset 818 of available data objects. This subset 818 comprises the portions of the metadata and the device ID. At 820, the voucher key is used in an attempt to decrypt the voucher. If the decryption is successful, the content key is obtained from the decrypted voucher at 808.

If the attempted decryption at 820 is not successful, the reader device forms the voucher key at 822 based on a subset 824 of available data objects. This subset 824 comprises the user account secret and the selected portions of the metadata. In cases where the reader device is associated with multiple user account secrets, 822 will comprise forming a voucher key corresponding to each of these user account secrets. At 826 the voucher key or keys are used in an attempt to decrypt the voucher. If the decryption is successful using any one of the voucher keys, the content key is obtained from the decrypted voucher at 808. Otherwise, if the attempted decryption is unsuccessful, the reader device reports a failure to obtain the content key and is unable to open the eBook.

In some implementations, the voucher key itself is embedded in the voucher. In order to determine whether the voucher has been successfully decrypted, the eBook reader device attempts to read the voucher key from the voucher. If the voucher key can be obtained from the decrypted voucher, the eBook reader concludes that it has successfully decrypted the voucher.

License Management

Figure 9:
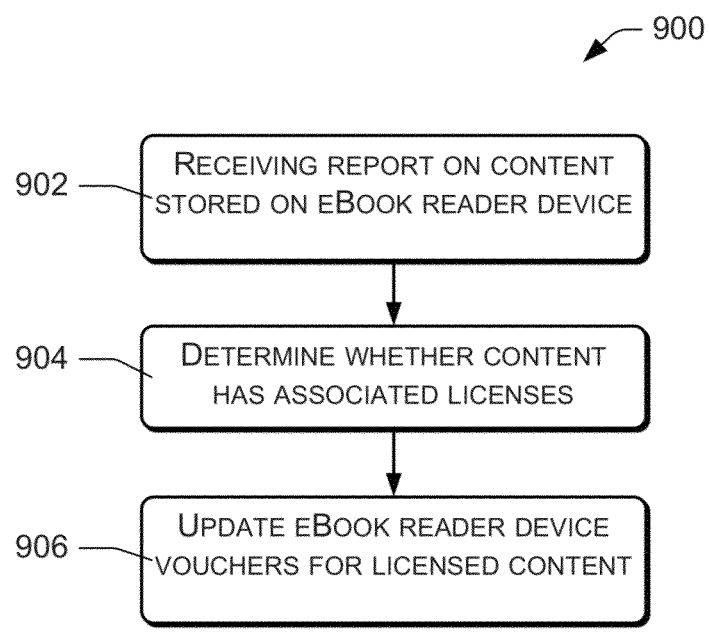
FIG. 9 is a flow diagram illustrating a process for managing content licenses on eBook reader devices.

FIG. 9 illustrates a general process 900 performed periodically between the supervisory server 102 and the eBook reader device 104 to manage content licenses by ensuring that the eBook reader device 104 has any vouchers necessary to unlock and open licensed or authorized eBooks.

At 902, the supervisory server 102 assesses content stored on the eBook reader device. This is accomplished by requesting a report from the eBook reader device 104 that indicates which media items are currently on the eBook reader device. The eBook reader device creates the report and provides it to the supervisory server. The report contains a snapshot of all content on the device, listed by watermark, UPC, Library of Congress number, or other unique identifying information.

At 904, the server 102 determines whether the reported content is licensed for that particular eBook reader device 104. The server 102 compares the report from the eBook reader device 104 with records maintained at the server to determine if the user of the device has purchased or otherwise obtained rights to the content.

At 906, the server 102 creates updated vouchers as necessary and provides them to the eBook reader device to enable it to open any additional licensed media items indicated by the reports. The eBook reader 104 receives the updated vouchers and stores them in its non-volatile memory for future use in conjunction with received or stored eBooks.

Updating a voucher on the eBook reader device might be appropriate or necessary, for example, when a user has moved a purchased eBook from one device to another. The original voucher associated with the eBook will not work on the second device—the second device will not be able to form the correct voucher key because such formation depends on the serial number of the reader device. Instead, the server 102 calculates a new voucher key and provides a new voucher that is encrypted with the new voucher key. This enables the second reader device to unlock or decrypt the new voucher key and thereby open the eBook.

The process 900 of FIG. 9 may be repeated at various intervals, depending on the likelihood that a user's reader device will have changed content in any given time period. If the user has several authorized reader devices, there may be a desire to perform the procedure more frequently. If the user has only a single reader device, a low frequency is probably adequate.

In some cases, the report provided to the server 102 may indicate unauthorized content on the eBook reader device 104. In this case, vouchers may be updated to prevent opening the unauthorized content. For example, vouchers may be updated to contain null content keys or invalid content keys. Alternatively, vouchers may be simply removed from the eBook reader device. Other measures may be taken in some situations in order to prevent usage of such unauthorized content on the reader device. For instance, the server 102 may instruct the eBook reader device 104 to remove the content. Furthermore, reports such as this may reveal fraudulent usage of the reader device or eBook distribution system, allowing fraudulent users to be tracked and identified.

Timed Release

Figure 10:
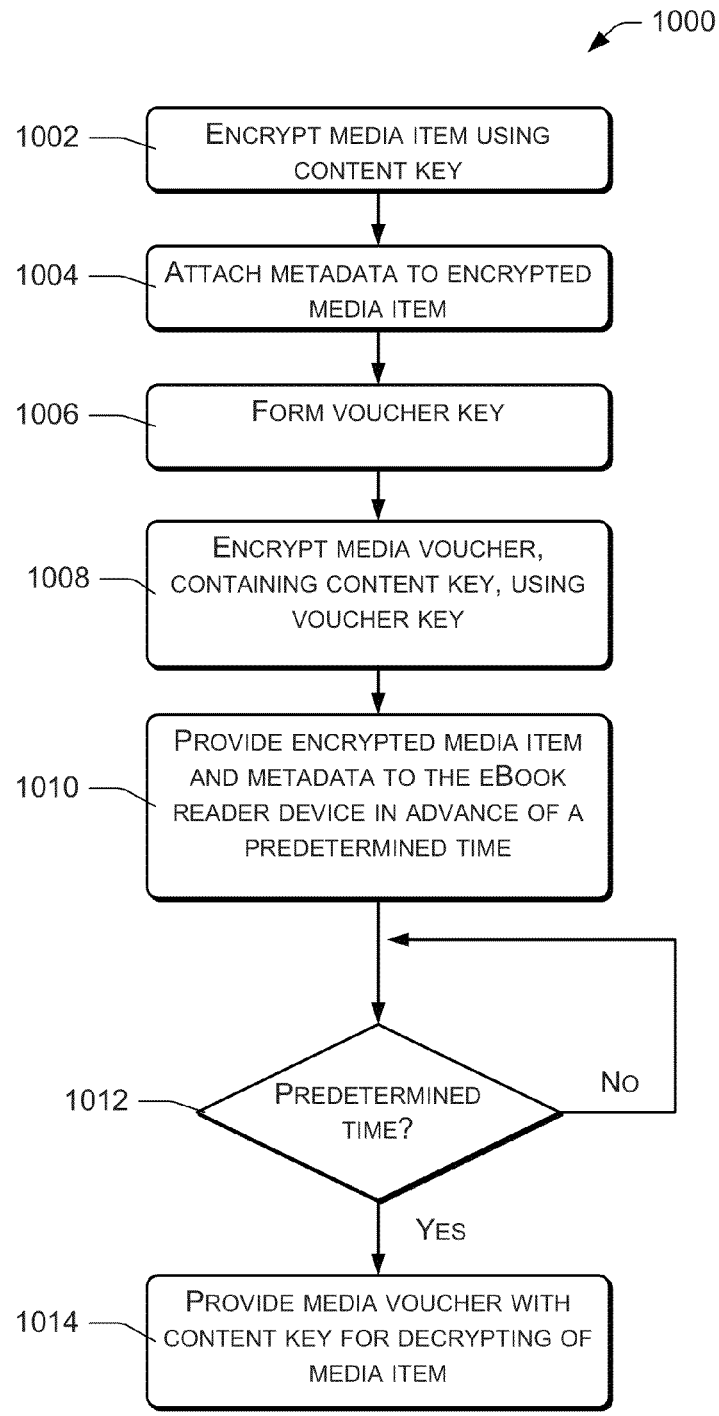
FIG. 10 is a flow diagram illustrating a process for delivering locked media items at a first time, and subsequently providing the unlocking vouchers at another time.

FIG. 10 illustrates a general process 1000 performed by the supervisory server 102 that enables locked media items to be pre-released before a predetermined release time, and to subsequently provide the unlocking vouchers at the release time.

At 1002, the server 102 encrypts a media item using the content key. At 1004, the server 102 attaches unencrypted metadata to the encrypted media item. At 1006, the server 102 forms the voucher key, similar to that described above with respect action 508 of FIG. 5. The voucher key is formed as a hash function of at least three variables that include (a) a user account secret, (b) at least portions of the metadata, and (c) a device ID or serial number of a particular eBook reader.

At 1008, the server 102 forms a voucher containing the content key and encrypts the voucher using the voucher key. At 1010, the server 102 provides the encrypted or locked media item to the eBook reader device using any of the delivery techniques described above with reference to FIG. 1.

At 1012, the process 1000 continues to evaluate whether a predetermined time has occurred. This time may be a date, a time of day, or a delay from the time the encrypted media item is provided. Once the predetermined time is reached (i.e., the "Yes" branch from 1012), the server 102 provides the media voucher to the eBook reader device for use in decrypting the media item.

With this process 1000, the media items may be distributed before an official release date. Since certain items may be large in size, this pre-distribution allows users to order the items in advance of the release date. Then, upon the release date, the server may efficiently distribute the vouchers to all devices for use in unlocking the media items.

This process may be used, for example, in the pre-release of widely expected new work releases, like a popular book. Further, this process may be used in educational situations where an instructor provides a locked test booklet electronically, and only distributes the voucher to unlock the test booklet when the test is to begin. Other scenarios are also possible.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of distributing electronic books, comprising:
  encrypting content of an electronic book with a first randomly generated cryptographic key, the electronic book including associated metadata;
  selecting a subset of the associated metadata;
  creating a second cryptographic key by performing a hash function on a plurality of input parameters including (a) a user account secret, (b) the subset of the associated metadata, and (c) a device ID of a particular electronic book reader device, wherein the subset of the associated metadata includes usage rights parameters concerning the electronic book;
  encrypting a book voucher with the second cryptographic key, the book voucher containing the first randomly generated cryptographic key; and
  providing the electronic book, the associated metadata, and the encrypted book voucher to the particular electronic book reader device, wherein the associated metadata of the electronic book indicates the subset of the associated metadata.

2. The method as recited in claim 1, further comprising specifying a tamper-proof parameter list in the associated metadata, the tamper-proof parameter list specifying the subset of the associated metadata.

3. The method as recited in claim 2, wherein the associated metadata includes a key-value pair that specifies the tamper-proof parameter list.

4. The method as recited in claim 1, further comprising supplying the user account secret to the particular electronic book reader device during an encrypted communications session.

5. The method as recited in claim 1, further comprising updating the book voucher on the particular electronic book reader device.

6. The method as recited in claim 1, further comprising:
  assessing which electronic books are currently on the particular electronic book reader device; and
  providing one or more updated book vouchers to the particular electronic book reader device to enable opening of one or more additional electronic books that are assessed to be on the particular electronic book reader device.

7. The method as recited in claim 1, further comprising:
  assessing which electronic books are currently on the particular electronic book reader device;
  determining that the electronic books currently on the particular electronic book reader device are licensed for the particular electronic book reader device, and providing one or more updated book vouchers to the particular electronic book reader device to enable opening of one or more additional licensed electronic books that are assessed to be on the particular electronic book reader device.

8. A dedicated handheld electronic book reader device, comprising:
  a display upon which electronic books are rendered;
  a processor;
  memory accessible to the processor, the memory containing instructions that are executable by the processor to open a particular electronic book by performing actions comprising:

receiving an encrypted book voucher associated with the particular electronic book, the particular electronic book including associated metadata;

forming a voucher key by performing a hash function on a plurality of input parameters including (a) an electronic book reader device ID; (b) a user account secret associated with a user of the electronic book reader device; and (c) at least a portion of metadata associated with the particular electronic book, the metadata including usage rights parameters concerning the particular electronic book, wherein the metadata indicates the at least a portion of the metadata;

using the voucher key to decrypt the encrypted book voucher associated with the particular electronic book to obtain a decrypted book voucher;

obtaining a randomly generated content key from the decrypted book voucher; and decrypting content of the particular electronic book with the randomly generated content key.

9. The dedicated handheld electronic book reader device as recited in claim 8, wherein the metadata associated with the particular electronic book comprises a plurality of key-value pairs that are used as input to the hash function.

10. The dedicated handheld electronic book reader device as recited in claim 9, wherein forming the voucher key includes:

forming a first voucher key for the particular electronic book based on the electronic book reader device ID; and forming a second voucher key at least partly in response to determining that decryption of the encrypted book voucher with the first voucher key was unsuccessful, the second voucher key being formed by performing a hash function on a plurality of input parameters based on the electronic book reader device ID, the at least a portion of the metadata associated with the particular electronic book, and the user account secret associated with the user of the electronic book reader device.

11. The dedicated handheld electronic book reader device as recited in claim 10, wherein forming the voucher key further includes:

forming a third voucher key at least partly in response to determining that decryption of the encrypted book voucher with the second voucher key was unsuccessful, the third voucher key being formed by performing a hash function on a plurality of input parameters based on the electronic book reader device ID and the at least a portion of the metadata associated with the particular electronic book; and forming a fourth voucher key at least partly in response to determining that decryption of the encrypted book voucher with the third voucher key was unsuccessful, the fourth voucher key being formed by performing a hash function based on the user account secret and the at least a portion of the metadata associated with the particular electronic book, wherein the fourth voucher key is used to decrypt the encrypted book voucher.

12. The dedicated handheld electronic book reader device as recited in claim 8, further comprising a network interface to facilitate receiving electronic books.

13. The dedicated handheld electronic book reader device as recited in claim 8, wherein the metadata further includes a tamper-proof key list specifying the at least a portion of the metadata associated with the particular electronic book.

14. The dedicated handheld electronic book reader device as recited in claim 8, the actions further comprising receiving the user account secret from a supervisory server during an encrypted communication session.

15. The dedicated handheld electronic book reader device as recited in claim 8, further comprising receiving the encrypted book voucher along with receiving the particular electronic book.

16. The dedicated handheld electronic book reader device as recited in claim 8, further comprising receiving the encrypted book voucher apart from receiving the particular electronic book.

17. A method of accessing a media item on an electronic book reader device, the method comprising:

receiving, by the electronic book reader device, the media item that is encrypted with a randomly generated content key, the media item including a plurality of metadata items that are associated with the media item;

receiving, by the electronic book reader device, an encrypted voucher that includes the randomly generated content key;

forming a voucher key that is a hash function of information based at least in part on (a) a book reader device ID associated with the electronic book reader device, (b) one or more metadata items of the plurality of metadata items, wherein the media item indicates the one or more metadata items, and (c) a user account secret associated with a user of the electronic book reader device, such that a first voucher key is different from a second voucher key when the first voucher key is a function of first information and the second voucher key is a function of second information, the first information being different from the second information;

decrypting the encrypted voucher with the voucher key to obtain the randomly generated content key; and decrypting the encrypted media item with the randomly generated content key to obtain content of the media item.

18. The method as recited in claim 17, wherein the one or more metadata items include usage rights parameters.

19. The method as recited in claim 17, further comprising obtaining a tamper-proof parameter list from the plurality of metadata items, the tamper-proof parameter list specifying the one or more metadata items of the plurality of metadata items.

20. The method as recited in claim 17, further comprising receiving the user account secret from a remote server during an encrypted communication session.

21. The method as recited in claim 17, wherein forming the voucher key is repeated whenever opening the media item.

22. The method as recited in claim 17, wherein a voucher is updated after the electronic book reader device receives the media item.

23. The method as recited in claim 17, further comprising:

creating a report indicating which media items are currently on the electronic book reader device;

providing the report to a supervisory server; and receiving one or more updated vouchers.

24. The method as recited in claim 17, wherein forming the voucher key includes performing a one-way hash function on input parameters based on the book reader device ID, the one or more metadata items, and the user account secret.

25. A method of restricting access to a media item prior to distribution of the media item to an electronic book reader device, comprising:

encrypting the media item with a first cryptographic key that is randomly generated;

attaching metadata to the encrypted media item;

forming a second cryptographic key by performing a hash function on a plurality of input parameters including (a) a user account secret, (b) at least a portion of the metadata, wherein the metadata indicates the at least a portion of the metadata, and (c) a device ID of the electronic book reader device, wherein the at least a portion of the metadata includes usage rights parameters associated with the media item; and encrypting a media voucher with the second cryptographic key, the media voucher containing the first cryptographic key.

26. The method as recited in claim 25, further comprising sending an updated media voucher to an additional electronic book reader device associated with the user at least partly in response to the media item being moved from the electronic book reader device to the additional electronic book reader device.

27. The method as recited in claim 25, further comprising specifying a tamper-proof key list in the metadata, the tamper-proof key list specifying the at least a portion of the metadata.

28. The method as recited in claim 25, further comprising supplying the user account secret to the electronic book reader device during an encrypted communications session.

29. The method as recited in claim 25, further comprising providing the media voucher to the electronic book reader device to enable the electronic book reader device to open the media item.

30. The method as recited in claim 25, further comprising providing the encrypted media item to the electronic book reader device at a first time, and providing the media voucher to the electronic book reader device at a second time to enable the electronic book reader device to open the media item, the second time being different than the first time.

31. The method as recited in claim 25, further comprising:
receiving reports from the electronic book reader device indicating which media items are currently on the electronic book reader device;
providing one or more updated media vouchers to the electronic book reader device to enable the electronic book reader device to open one or more additional media items indicated by the reports.

32. The method as recited in claim 25, further comprising:
receiving, by a server, reports from the electronic book reader device indicating which media items are currently on the electronic book reader device;
determining, by the server, that the indicated media items are licensed for the electronic book reader device; and
providing, by the server, one or more updated media vouchers to the electronic book reader device to enable the electronic book reader device to open one or more additional licensed media items indicated by the reports.

33. A method of restricting access to a media item on an electronic book reader device, comprising:
encrypting the media item with a first cryptographic key that is randomly generated, the media item including associated metadata;
forming a second cryptographic key by performing a hash function on a plurality of input parameters including (a) a user account secret, (b) a subset of the associated metadata, and (c) a device ID of the electronic book reader device, wherein the associated metadata includes one or more key-value pairs that specify a tamper-proof parameter list, and the tamper-proof parameter list indicates the subset of the associated metadata;
encrypting a media voucher with the second cryptographic key, the media voucher containing the first cryptographic key;
providing the encrypted media item and the metadata to the electronic book reader device at a first time; and
providing the media voucher to the electronic book reader device at a second time that is different than, and temporally after, the first time.

34. The method as recited in claim 33, wherein the second time comprises a predefined time, and the method further comprising determining when the predefined time occurs, and subsequently initiating the providing of the media voucher.

\* \* \* \* \*